United States Patent [19]
Arzoumanian

[11] Patent Number: 5,963,637
[45] Date of Patent: Oct. 5, 1999

[54] TELEPHONE CALLING CARD DIALER

[76] Inventor: Corey C. Arzoumanian, 4404 Price St., Los Angeles, Calif. 90027

[21] Appl. No.: 08/825,812

[22] Filed: Apr. 3, 1997

[51] Int. Cl.⁶ .................................................. H04M 1/00
[52] U.S. Cl. .......................... 379/355; 379/354; 379/216
[58] Field of Search .................................. 379/216, 354, 379/355

[56] References Cited

U.S. PATENT DOCUMENTS

| | | | |
|---|---|---|---|
| 4,769,835 | 9/1988 | Hirth et al. | 379/355 |
| 4,817,135 | 3/1989 | Winebaum | 379/355 |
| 4,882,750 | 11/1989 | Henderson et al. | 379/355 |
| 4,941,172 | 7/1990 | Winebaum et al. | 379/355 |
| 4,980,910 | 12/1990 | Oba et al. | 379/355 |
| 4,989,240 | 1/1991 | Fuse et al. | 379/355 |
| 5,050,138 | 9/1991 | Yamada et al. | 368/10 |
| 5,054,051 | 10/1991 | Hoff | 379/56 |
| 5,181,744 | 1/1993 | Betheil | 283/56 |
| 5,241,590 | 8/1993 | Deakins et al. | 379/356 |
| 5,280,516 | 1/1994 | Jong | 379/57 |
| 5,305,372 | 4/1994 | Tomiyori | 379/59 |
| 5,343,519 | 8/1994 | Feldman | 379/355 |
| 5,353,017 | 10/1994 | Suzuki et al. | 340/825.46 |
| 5,357,566 | 10/1994 | Dowling, Jr. et al. | 379/355 |
| 5,363,437 | 11/1994 | Shen et al. | 379/355 |
| 5,372,263 | 12/1994 | Bazemore et al. | 379/355 |
| 5,377,263 | 12/1994 | Bazemore et al. | 379/355 |
| 5,440,625 | 8/1995 | Puri | 379/355 |
| 5,452,352 | 9/1995 | Talton | 379/355 |
| 5,485,513 | 1/1996 | Goedken et al. | 379/355 |
| 5,539,819 | 7/1996 | Sonoyama et al. | 379/355 |
| 5,583,933 | 12/1996 | Mark | 379/355 |

Primary Examiner—N. Le
Assistant Examiner—Shih-wen Hsieh
Attorney, Agent, or Firm—Norton R. Townsley

[57] ABSTRACT

A dedicated telephone dialer capable, in one embodiment, of automatically dialing a preprogrammed calling card abbreviated telephone number at one speed, waiting for a short period and then dialing a preprogrammed access number and, optionally, a preprogrammed personal identification number (PIN) at a slower speed. In second and third embodiments the dedicated telephone dialer is capable of automatically dialing a preprogrammed calling card abbreviated telephone number at one speed upon first activation and, dialing a preprogrammed access number and, optionally, a preprogrammed PIN at a slower speed, upon second activation. This invention comprises electrical circuitry for generating DTMF tones, logic for dialing the requisite numbers, and a switch, or switches in the case of the third embodiment, for initiating the dialing sequence or sequences. The electrical circuitry includes a replaceable power source, a number generating device, and a tone generating device. The dialing logic is contained in a microprocessor. The circuitry and logic device are all contained within a case which includes a grille to allow penetration of the DTMF tones. The switch is mounted on the exterior of the case. To use this invention it is held up to the transmitter of an off-hook telephone handset, the first digit of the access number is dialed from the telephone keypad then the switch or switches on this invention are activated.

15 Claims, 5 Drawing Sheets

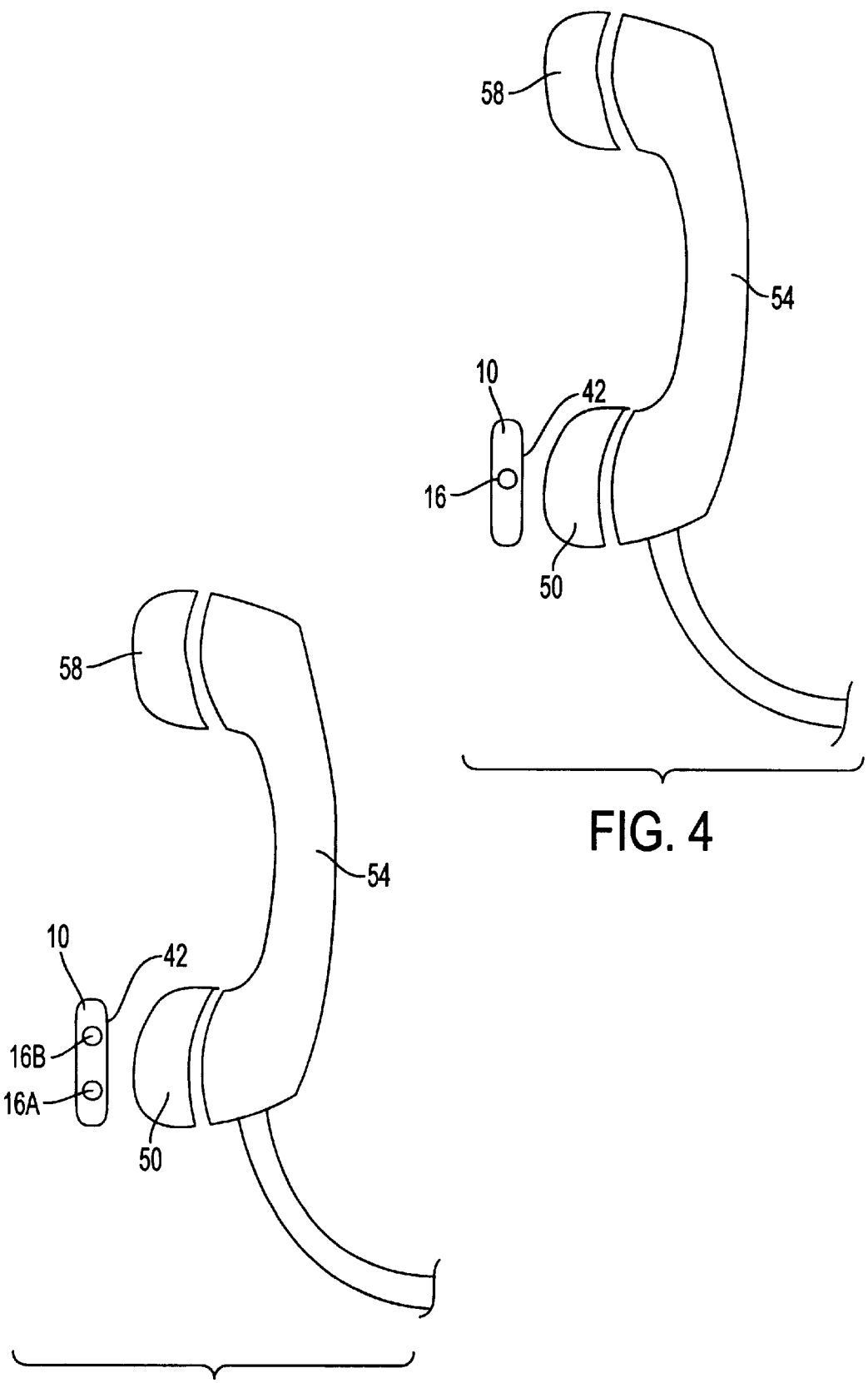

TELEPHONE CALLING CARD DIALER

REFERENCES

The Applicant claims the benefit of his Disclosure Document no. 404,017 filed Aug. 19, 1996 and his prior filed application, Ser. No. 08/715,363. This Application was filed as a regular Application but was converted to a Provisional Application under 37 C.F.R §1.53(b)(2)(ii) in response to a Petition filed Feb. 14, 1997.

BACKGROUND OF THE INVENTION

The present invention relates to the field of portable, dial tone multi-frequency (DTMF) telephone number dialer devices.

Dialing telephone numbers can be a daunting task. Most telephone numbers consist of seven digits. In the United States, if you need to dial an area code of four digits then the number increases to eleven. The situation is similar in other countries. International access and country codes add five or six more. If in addition, you have to use a calling card you must dial a whole other phone number, usually including an area code, wait for some key or instructions, then dial an access number before you even start to dial the desired phone number. It can be seen that around 22 to 27 digits need to be dialed to make a connection. If you make a mistake in dialing this long sequence of numbers, you must start over again. The whole process of making a phone connection is fraught with the possibility of error. If you are making a call from a telephone kiosk in a noisy airport, holding your calling card in one hand and your notebook in the other with the telephone receiver cradled under your neck, the possibility of making a mistake in dialing increases exponentially.

For many years now, DTMF signals have been used for dialing telephone numbers. Many people realized that the process of dialing the phone could be simplified by utilizing a device that could store the long sequences of tones necessary to dial the phone. Phone makers have produced phones with a limited number of memory registers that can be accessed with the push of a button.

Telephone calling cards have achieved popularity as a means to reduce the cost and bother of making long distance and international calls from pay and hotel phones. Using a calling card obviates the need to carry massive amounts of change for the pay phone. It also avoids the expense of connecting through a hotel switchboard. Many calling card companies offer discounted long distance rates also.

However, as pointed out above, using a calling card does not represent the ultimate in convenience because of the large number of digits that must be dialed to make a connection. There are a large number of patents covering electronic calling cards but they suffer from a number of deficiencies.

Development of a combination telephone calling card and dialer which can automatically, reliably and simply dial a preprogrammed phone number, then dial a preprogrammed access number and, optionally, a preprogrammed personal identification number (PIN) represents a great improvement in the field of telephone calling cards and satisfies a long felt need of people who frequently use public and hotel telephones.

SUMMARY OF THE INVENTION

The present invention is a dedicated telephone dialer capable of automatically dialing a preprogrammed calling card number, then dialing a preprogrammed access number and, optionally, a preprogrammed personal identification number (PIN). This invention comprises electrical circuitry for generating DTMF tones; logic for dialing the specific, preprogrammed, abbreviated telephone number, and the specific, preprogrammed access number and, optionally, a PIN; and a switch for initiating the dialing sequence. For purposes of this application, abbreviated telephone number means a telephone number without the first digit. Practically, a calling card number must be a toll free number. Currently, in the USA this means an 11 digit number starting with "1-800" or "1-888". Consequently, in the USA the first digit will be a "1" and the abbreviated telephone number will be 10 digits long. In other countries, the numbers may differ but the concept will remain the same.

In a first embodiment, the logic includes a short pause between the two preprogrammed numbers. In a second embodiment, the logic is capable of generating the first number at the first switch closure and the second number at the second switch closure. In a third embodiment, the invention includes two switches. Closing the first causes generation of the first number while closing the second causes generation of the second number. In all embodiments the first number is the abbreviated telephone number and the second number is the access number and, optionally, the PIN. Furthermore, in all embodiments, the first number is generated or dialed at a faster speed than the second number.

The electrical circuitry includes a replaceable power source, a number generating device, and a tone generating device. The dialing logic is contained in a microprocessor. The circuitry and logic device, except for the switch, are all contained within a case which includes a grille to allow penetration of the DTMF tones. The switch or switches, of course, are mounted on the exterior of the case for convenient access and, preferably, the speaker is in the rear of the case.

The case can be of any convenient shape but for convenience and portability may be like a credit card. Alternatively, the dialer could be built into a pager. However, in the preferred embodiment the dialer is built into a watch, or a case shaped like a watch, which is adapted so that it can be removed from the wrist strap. In this way the dialer can be easily removed and held up to the transmitter of a telephone handset for use. To use this invention the first digit of the full telephone number must first be dialed from the key pad of the telephone.

An appreciation of the other aims and objectives of the present invention and an understanding of it may be achieved by referring to the accompanying drawings and description of a preferred embodiment.

BRIEF DESCRIPTION OF THE DRAWINGS

FIG. 4 is a sketch illustrating use of the first two embodiments of this invention.

FIG. 4A is a sketch illustrating use of the third embodiment of this invention.

DETAILED DESCRIPTION OF THE PREFERRED EMBODIMENT

When you use a conventional calling card, you first dial a phone number, which is, typically, a toll-free, 800 or 888 number. This phone number is the phone number the company has specially provided for this service. After connection you hear a tone or some instructions. Then you dial your card or access number. This card number uniquely identifies you as an authorized user of the system and provides the system with billing information. Some systems also allow for dialing of a preprogrammed personal identification number (PIN) at this point. Finally, you dial the number of the party that you want to reach. This number includes international and area codes, if necessary. Of course, the entire system is computer driven and the technology that allows such systems to function is the DTMF tones.

Figure 1:
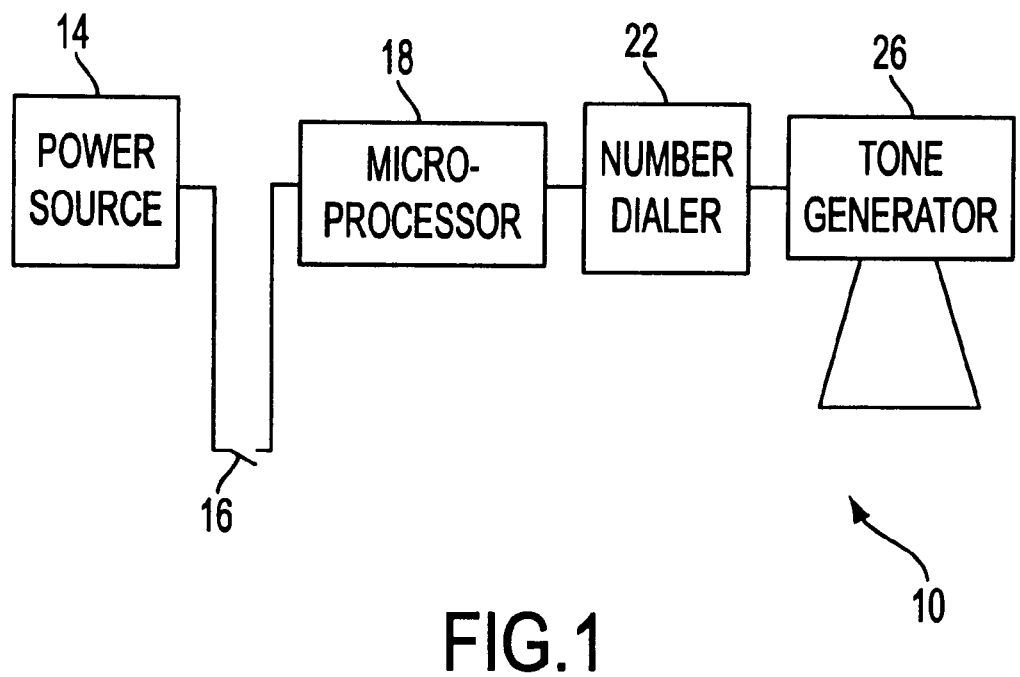
FIG. 1 is a block diagram showing the essential components of the first two embodiments of this invention.
Figure 1A:
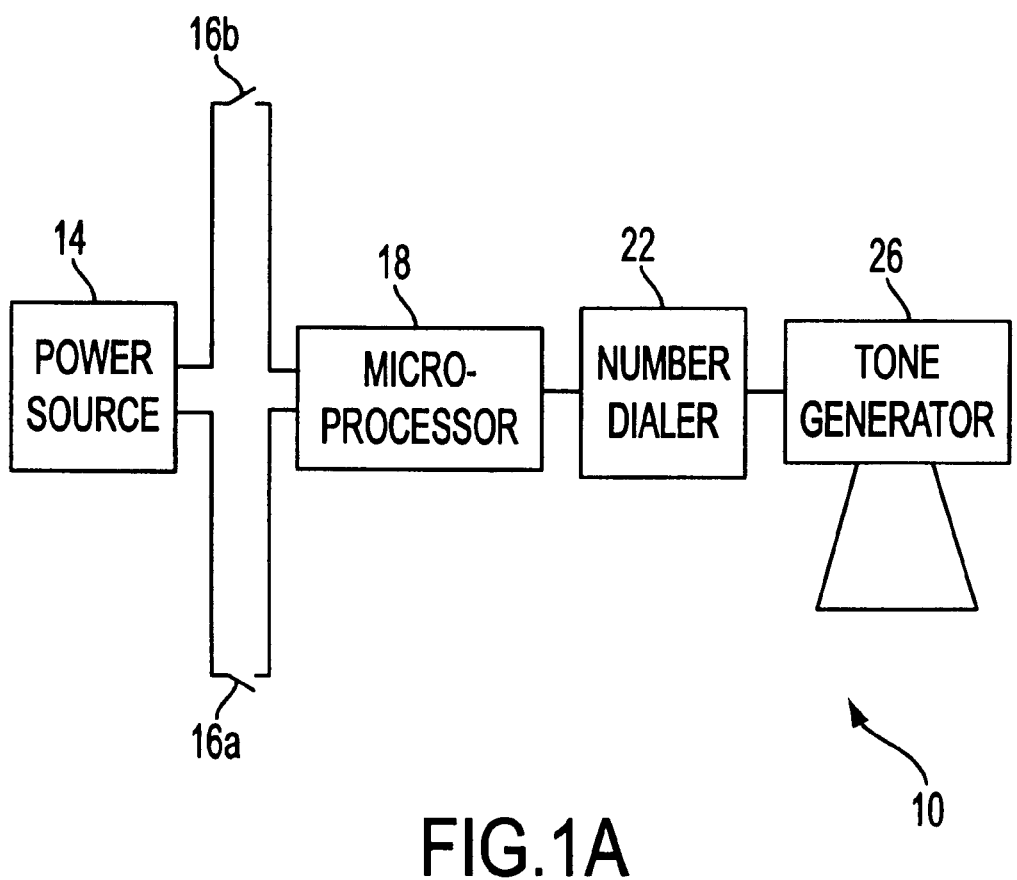
FIG. 1A is a block diagram showing the essential components of the third embodiment of this invention.

FIG. 1 is a block diagram showing the essential components of this invention 10. FIG. 1A illustrates an alternative block diagram. Being electrical, this invention must have a source of electrical power 14 and a switch 16, as illustrated in FIG. 1, to turn it on and off, i.e to activate it. Preferably, this source 14 is a replaceable battery and the switch 16 is a push button. The invention 10 preferably also includes a microprocessor 18, a number dialer 22 and a tone generator 26.

In a first embodiment, the microprocessor 18 is programmed to produce, upon activation, i.e. closure of the switch 16, a first sequence of numbers, to pause for a short interval and then to produce a second sequence of numbers. The short interval is needed to allow the telephone equipment to complete some switching and thus only needs to be a few seconds in duration. In a second embodiment, the microprocessor 18 is programmed to produce the first sequence of numbers upon first activation and a second sequence of numbers upon second activation. A third embodiment of the invention 10, illustrated in FIG. 1A, includes a first switch 16a and a second switch 16b. Closing the first switch 16a causes generation of the first sequence of numbers while closing the second switch 16b causes generation of the second sequence of numbers.

In all embodiments the first sequence of numbers is generated or dialed faster than the second sequence of numbers. The first sequence of numbers corresponds to a calling card company's abbreviated telephone number. As explained above, abbreviated telephone number means the telephone number without the first digit. The second sequence of numbers corresponds to the user's card or access number and, optionally, PIN. The other components in the circuit, the number dialer 22 and tone generator 26, function to convert the numbers produced by the microprocessor into appropriate DTMF tones.

So, when the first embodiment of this invention 10 is activated, upon closure of the switch 16, it produces the DTMF tones corresponding to a calling card company's abbreviated telephone number at a fairly fast speed, pauses for a short interval, then produces the DTMF tones corresponding to the user's access number and, optionally, PIN at a slower speed. In the second embodiment, when the invention 10 is first activated, upon closure of the switch 16 for the first time, it produces the DTMF tones corresponding to a calling card company's abbreviated telephone number at a fairly fast speed. Then, when the invention is next activated, upon closure of the switch 16 for the second time, the invention 10 produces tones corresponding to a the user's access number and, optionally, PIN at a slower speed. In the third embodiment. when the first switch 16a is closed the invention 10 produces the DTMF tones corresponding to a calling card company's abbreviated telephone number at a fairly fast speed. Then, when the second switch 16b is closed, the invention 10 produces tones corresponding to the user's access number and, optionally, PIN at a slower speed.

The components described above are all available in miniature sizes. Thus it is possible to fabricate this invention 10 as a very small portable unit. Consequently, it is possible to put the circuit for this invention 10 inside a very small case. For example, the invention 10 can be provided inside a case the size and shape of a credit card. This way, the invention 10, can be carried in a wallet or purse. Alternatively, the invention 10 can be incorporated into a pager or watch case. Whatever size the case is, it has to be provided with a grille to allow the DTMF tones to penetrate the case. Further, the tone generator 26 should be located close to the grille and the switch 16 must be mounted on the outside of the case.

The microprocessor 18 must be programmed with all the dialing logic and the requisite numbers. Programming of microprocessors 18 is a well known technology. In the case of this invention 10, a jack (not illustrated) could be provided for programming the assembled invention 10. Then the microprocessor 18 can be programmed by computer or any convenient means. As an alternate, the microprocessor 18 can be pre-programmed, by computer or other convenient means, and then the assembly of the invention 10 can be completed.

Figure 2:
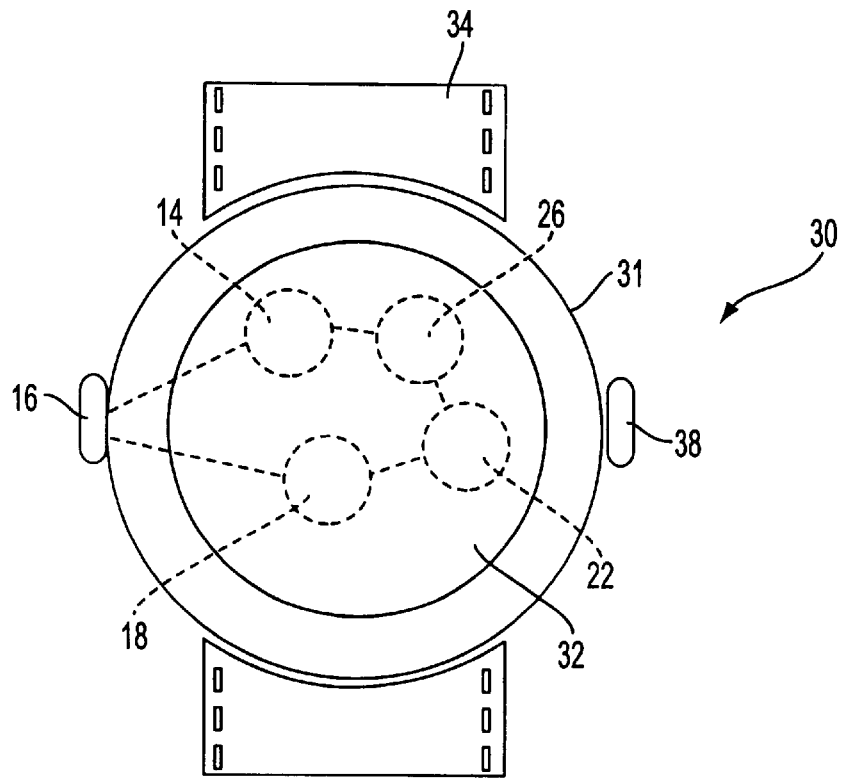
FIG. 2 is a front view of the invention incorporated into a watch case, attached to a watch band.

FIG. 2 is a front view of the invention incorporated 10 into a watch 30. The watch case 31 can have an analog or digital face 32. Preferably, the watch case 31 is removable from the band 34. On FIG. 2, the switch 16 is illustrated as opposite a single crown 38, but it will be appreciated that nowadays watches, and especially digital watches, have multiple push buttons. It will also be appreciated that if the third embodiment of the invention 10 is used, two switches 16a and 16b will appear on the case.

Figure 3:
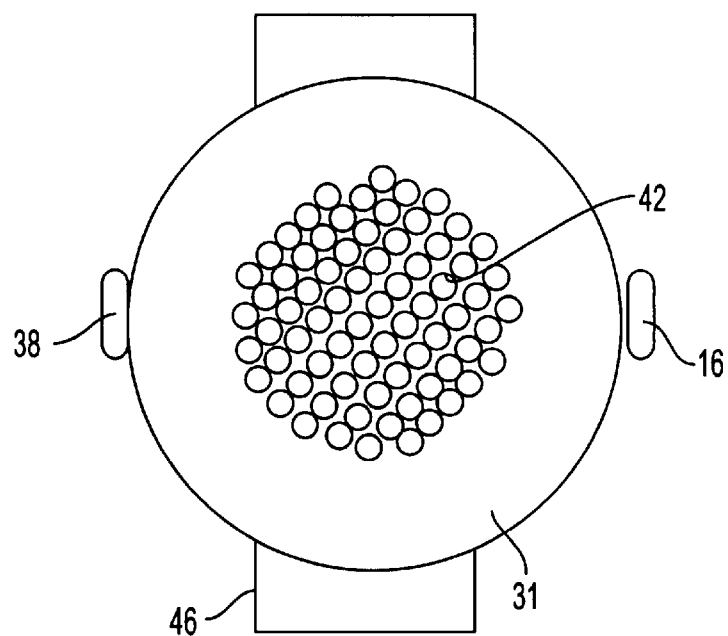
FIG. 3 is a rear view of the invention incorporated into a watch case, separated from the band.

FIG. 3 is a rear view of the watch case 31 illustrated in FIG. 2, separated from the band 34. The grille 42 is preferably placed on the rear of the watch case 31. In this view a simple mounting mechanism for mounting the case 31 on the band 34 can be seen. This mechanism comprises a pair of diametrically opposed D-rings 46 attached to the case 31. It will be appreciated that the band 34 can be slipped through these D-rings 46 so that the case 31 can be mounted and demounted from the band 34 with relative ease. Alternate designs for mounting and demounting are commonly available.

FIG. 4 is a sketch illustrating use of the first and second embodiments of the invention 10. The invention 10 is held close to the transmitter 50 of an off-hook telephone handset 54, preferably with the grille 42 facing the transmitter 50. While dial tone is still being emitted from the receiver 58, the first digit of the calling card company's system access telephone number is dialed from the keypad of the telephone. In the U.S., the digit that will be dialed from the keypad will typically be a "1". Then the button 16 is pressed. In the first embodiment, this initiates the invention 10 so that DTMF tones representing the preprogrammed abbreviated telephone number are emitted at a selected speed, followed by a short pause, and finally DTMF tones representing the authorized user's number and, optionally, PIN are emitted at a speed slower than the selected speed. This whole sequence causes dialing of the telephone, connection with the calling card system, and identification of the user. Then the user dials the phone number of the party he or she wishes to reach using the telephone in normal fashion.

In the second embodiment, pushing the button 16 for the first time causes generation of the DTMF tones representing the preprogrammed abbreviated telephone number at the selected speed. This sequence causes dialing of the telephone and connection with the calling card system. Once connection is established, pushing the button 16 for the second time causes generation of DTMF tones representing the authorized user's number and, optionally, PIN at a speed slower than the selected speed. This results in identification of the user. Then the user dials the phone number of the party he or she wishes to reach using the telephone in normal fashion.

FIG. 4A is a sketch illustrating use of the third embodiment of this invention. In the third embodiment, pushing button 16a causes generation of the DTMF tones representing the preprogrammed abbreviated telephone number at the selected speed. This sequence causes dialing of the telephone and connection with the calling card system. Once connection is established, pushing button 16b causes generation of DTMF tones representing the authorized user's number and, optionally, PIN at a speed slower than the selected speed. This results in identification of the user. Then the user dials the phone number of the party he or she wishes to reach using the telephone in normal fashion.

Figure 5A:
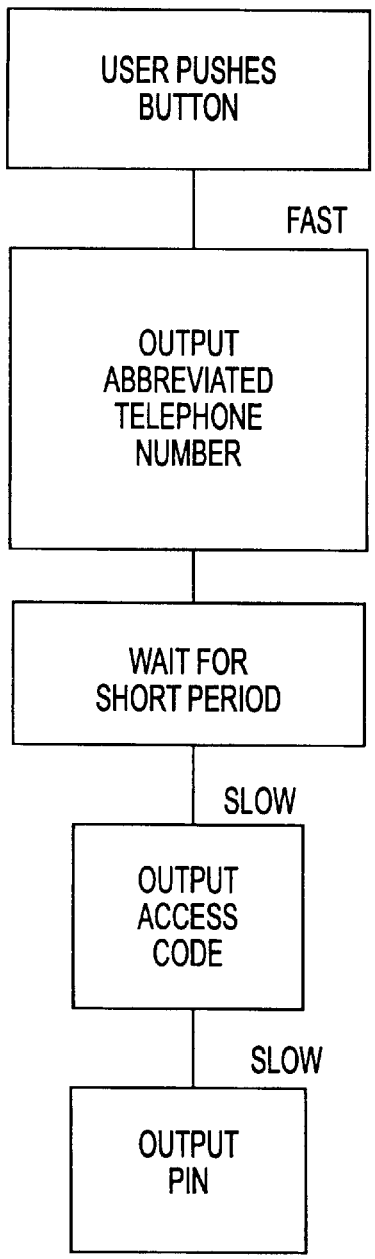
FIG. 5A is a flow chart illustrating one method of programming the microprocessor used in this invention.
Figure 5B:
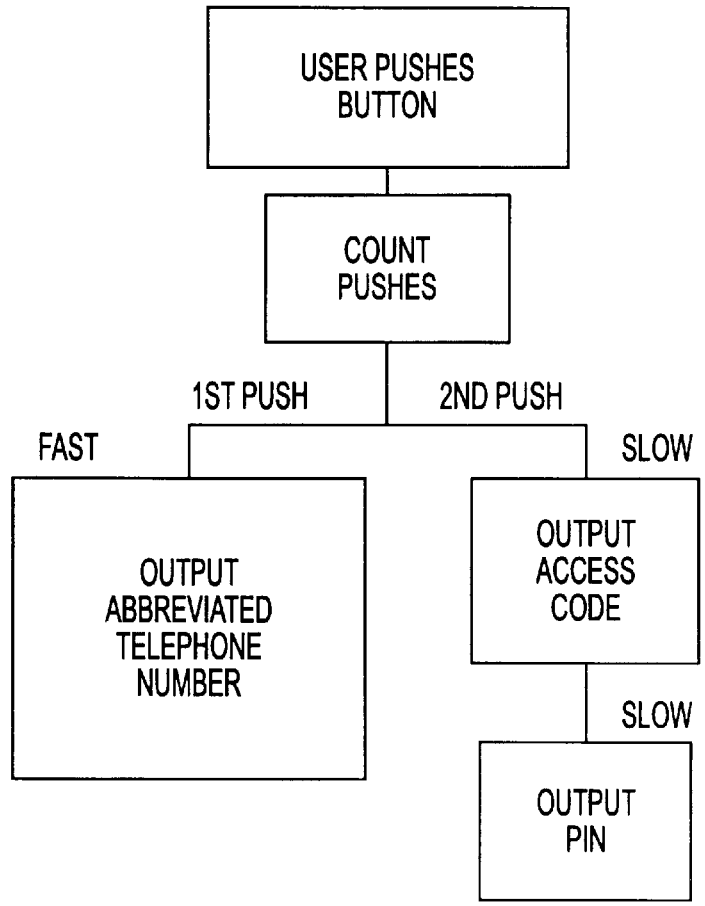
FIG. 5B is a flow chart illustrating a second method of programming the microprocessor used in this invention.
Figure 5C:
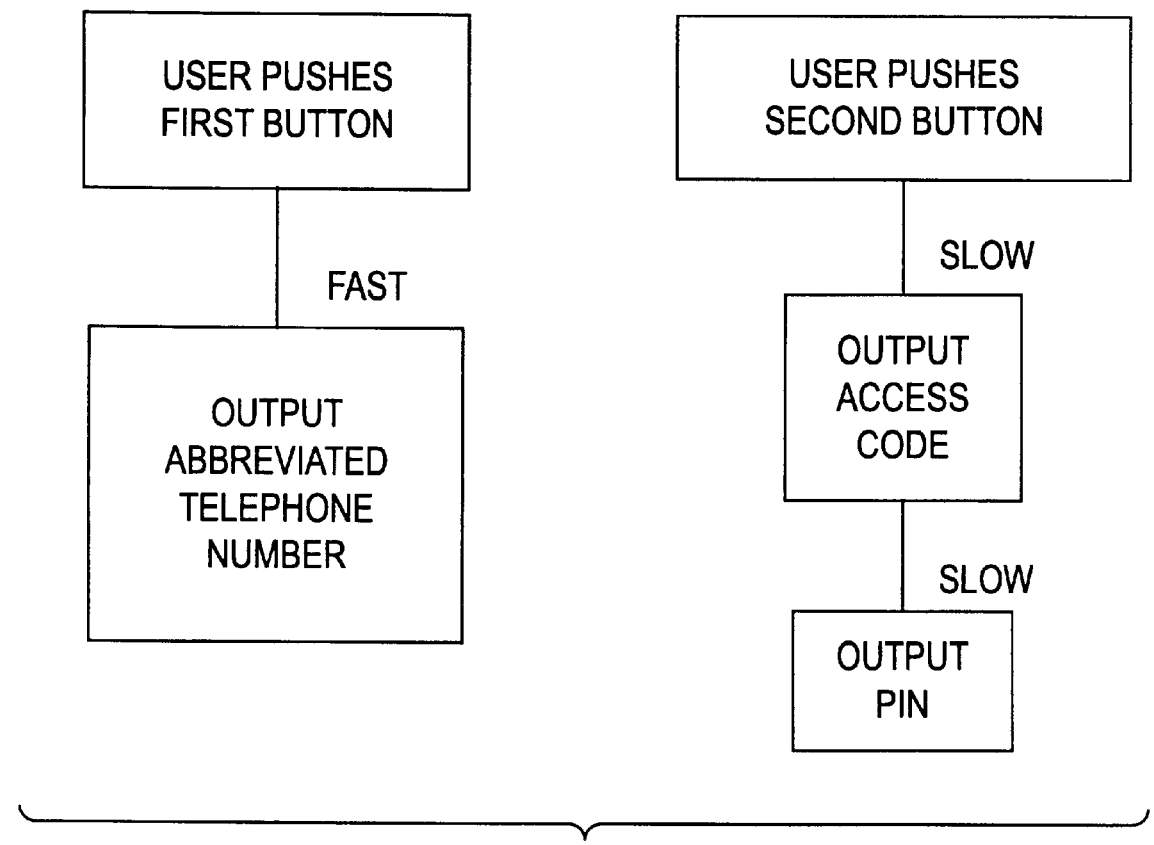
FIG. 5C is a flow chart illustrating a third method of programming the microprocessor used in this invention.

FIGS. 5A–5C illustrate, in simplified form, the different methods of programming the microprocessor 18 used in this invention 10. In the first method, shown in FIG. 5A, when the user pushes the button 16 the microprocessor 18 outputs the abbreviated telephone number at a relatively fast speed, waits for a short period and then outputs the access code and, optionally, the PIN at a relatively slower speed. Again, the short period is needed to allow the telephone equipment to complete some switching and thus only needs to be a few seconds in duration.

In the second method, shown in FIG. 5B, the microprocessor is programmed to count the number of pushes on the button 16. If the button 16 is being pushed for the "first" time, then the microprocessor 18 outputs the abbreviated telephone number at a relatively fast speed. If the button 16 is being pushed for the "second" time, then the microprocessor 18 outputs the access code and, optionally, the PIN at a relatively slower speed. Of course, actual programming will cause the microprocessor to alternately output the telephone number and the access code, and optional PIN, whenever the button 16 is pushed.

In the third method, shown in FIG. 5C, when the user pushes the first button 16a the microprocessor 18 outputs the abbreviated telephone number at a fast speed and, when the user pushes the second button 16b, the microprocessor 18 outputs the access code and, optionally, the PIN at a slower speed.

It will be appreciated that use of this invention 10 makes making a calling card connection much simpler. Thus this invention 10 will be a boon to telephone users. Units of this invention will be sold by calling card companies preprogrammed with the system abbreviated telephone number and the authorized user's individual identification or access number and optional PIN. As with all calling card systems, the system will be set up to stop use by unauthorized callers.

This invention has a number of distinct advantages over the prior art.

1) Some telephones have no keypad. They are usually for emergency use and, as soon as the receiver is picked up calls are routed to a particular operator. Prior art dialers can defeat the restricted use of such phones and allow users to rout calls to other destinations. This invention does not allow the use of restricted phones to be defeated.

2) In order to prevent users from using pay phones without paying, the receivers on many pay phones are initially muted. Muting is accomplished by either disconnecting the microphone or turning up the volume. This forces users to dial numbers manually from the keypad and prevents the use of prior art dialers. Dialing even one digit from the keypad enables the phone company switch to accept the remaining DTMF tones, whether generated from the keypad or from an external tone generator.

Requiring users to dial the first digit from the keypad allows the use of this invention with most pay phones. Of course, the first digit must be dialed within a certain period or switching will not proceed and the phone must be hung up. Likewise, this invention must be activated within a certain period of dialing the first digit.

The third embodiment of this invention would be useful even with pay phones that require entry of a complete phone number from the keypad. This is because the third embodiment has a separate button for entering the access number.

The reference numerals shown on FIGS. 1–4A are summarized below.

10 Telephone calling card dialer
14 Replaceable power source
16 Switch
16a First switch
16b Second switch
18 Microprocessor
22 Number dialer
26 Tone generator
30 Watch version
31 Watch case
32 Watch strap
34 Watch strap
38 Crown
42 Grille
46 D-ring
50 Telephone transmitter
54 Telephone handset
58 Telephone receiver The telephone calling card dialer 10 has been described with reference to particular embodiments. Other modifications and enhancements can be made without departing from the spirit and scope of the claims that follow.

What is claimed is:

1. A dedicated telephone dialer comprising:

a. a case having an interior cavity and a grille;

b. generating means, contained in said cavity, for generating DTMF tones corresponding to a specific abbreviated telephone number at a first speed, waiting for a short period, and then generating DTMF tones corresponding to a specific access number at a second speed; said second speed being slower than said first speed; a telephone number having eleven digits starting with a "1" and a toll free area code; an abbreviated telephone number having ten digits and being equal to said telephone number minus the initial "1"; and c. initiating means, mounted on said case and electrically connected to said generating means, for initiating said generating means;

whereby authorized connection to a calling card system is made by removing a receiver from a telephone, dialing said inital "1" on said telephone, placing the grille of said dedicated telephone dialer adjacent to the transmitter of said receiver and initiating said dedicated telephone dialer by said initiating means.

2. A dedicated phone dialer as claimed in claim 1 in which, additionally, said generating means finally generates DTMF tones corresponding to a specific PIN at said second speed.

3. A dedicated telephone dialer as claimed in claim 1 in which said generating means is a replaceable power source, a microprocessor, a number generating device, and a tone generating device, all electrically connected together.

4. A dedicated telephone dialer as claimed in claim 1 in which said initiating means is a push button switch.

5. A dedicated telephone dialer as claimed in claim 1 in which said case is shaped like a thin disk.

6. A dedicated telephone dialer as claimed in claim 5 in which said case is adapted to be fastened to and removed from a wrist strap with relative ease.

7. A dedicated telephone dialer as claimed in claim 1 in which said case is thin and rectangular, and adapted to be carried in a wallet.

8. A dedicated telephone dialer as claimed in claim 1 in which said case is a watch case of a wristwatch.

9. A dedicated telephone dialer as claimed in claim 8 in which said watch case has a front and a rear and said grille is located in said rear.

10. A dedicated telephone dialer as claimed in claim 8 in which said watch case is adapted to be fastened to and removed from a watch strap.

11. A dedicated telephone dialer as claimed in claim 1 in which said case is a pager.

12. A dedicated telephone dialer as claimed in claim 1 in which said case is one of a wristwatch and pager.

13. A method of building, programming and using a telephone dialer capable of functioning as a calling card comprising the steps of:
   a. providing a case having an exterior, an interior cavity, and a grille;
   b. installing a switch on said exterior;
   c. installing within said cavity a generating means for generating DTMF tones;
   d. connecting said switch to said generating means;
   e. programming said generating means to generate, upon activation by said switch, DTMF tones corresponding to a specific abbreviated telephone number at a first speed, to wait for a short period, and then to generate DTMF tones corresponding to a specific access number at a second speed; said second speed being slower than said first speed; a telephone number having eleven digits starting with a "1" and a toll free area code; an abbreviated telephone number having ten digits and being equal to said telephone number minus the initial "1";
   f. removing a receiver from a telephone;
   g. dialing said inital "1" on said telephone;
   h. placing the grille of said dedicated telephone dialer adjacent to the transmitter of said receiver; and
   i. operating said dedicated telephone dialer by activating said switch.

14. A method as claimed in claim 13 further comprising the step of additionally programming said generating means to finally, additionally, generate DTMF tones corresponding a specific PIN at said second speed.

15. A method as claimed in claim 13 in which said dedicated telephone dialer is capable of use with one of a wristwatch and pager.

* * * * *